July 19, 1932.　　　J. BURGGRAFF　　　1,867,726
TRACTOR HITCH
Filed July 3, 1930　　　3 Sheets-Sheet 1
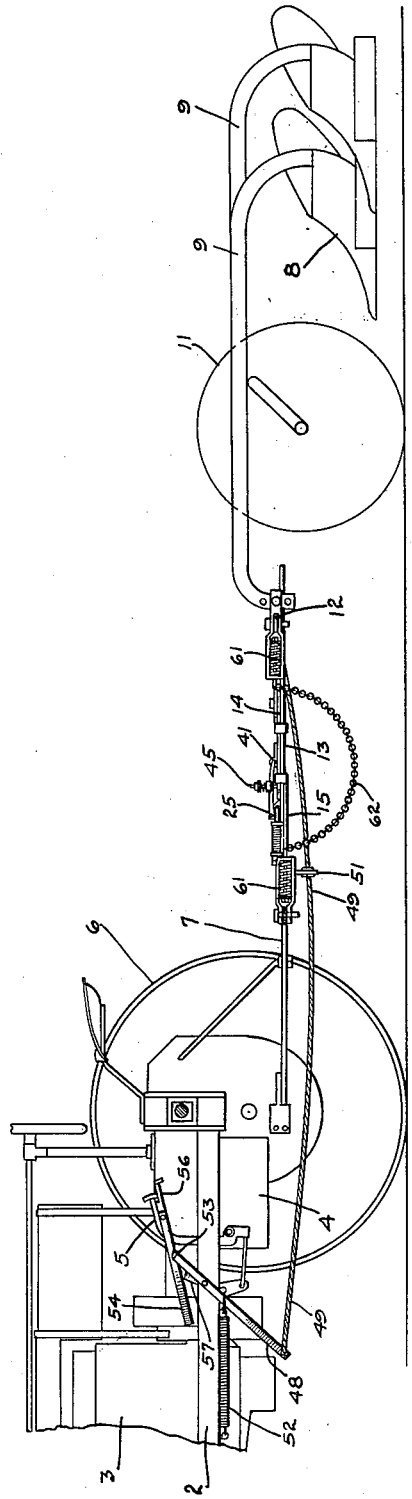
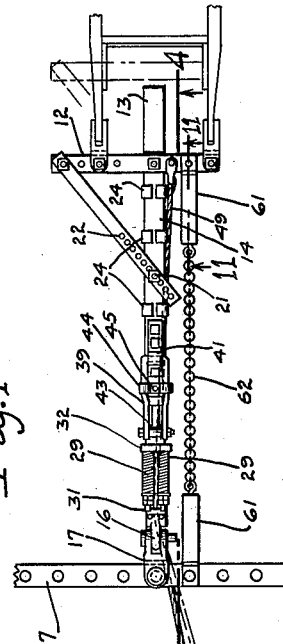
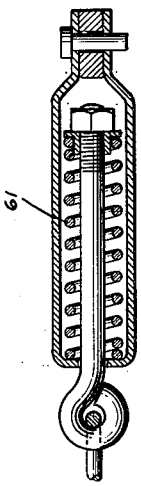
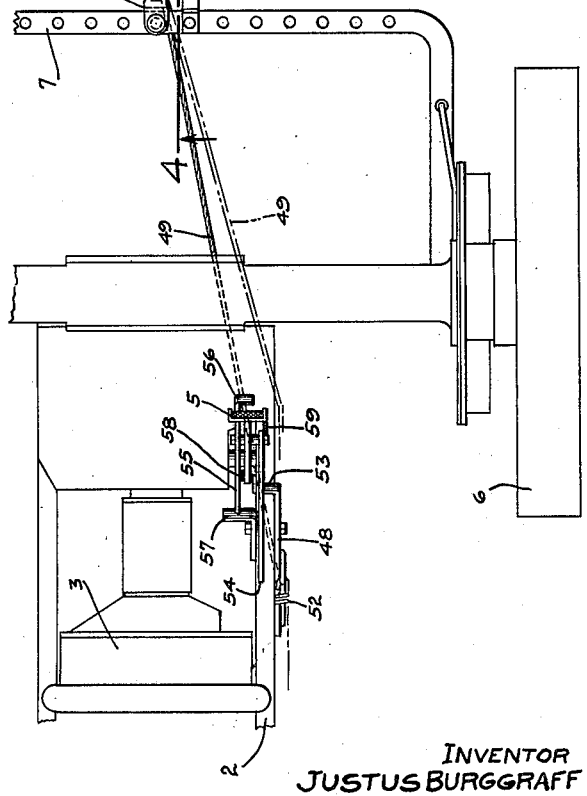
INVENTOR
JUSTUS BURGGRAFF
ATTORNEYS

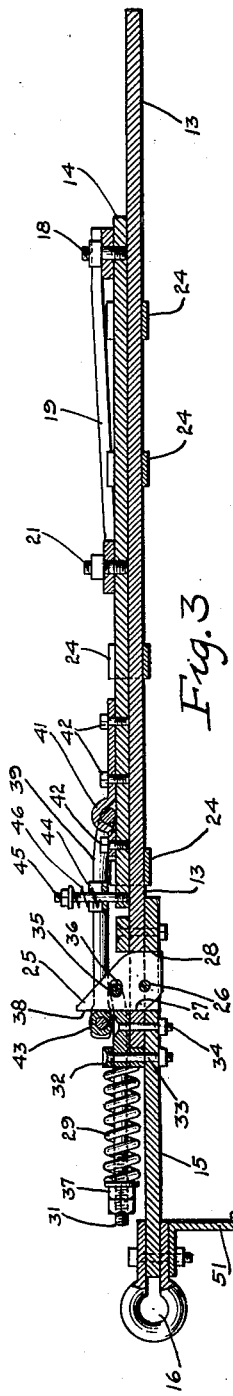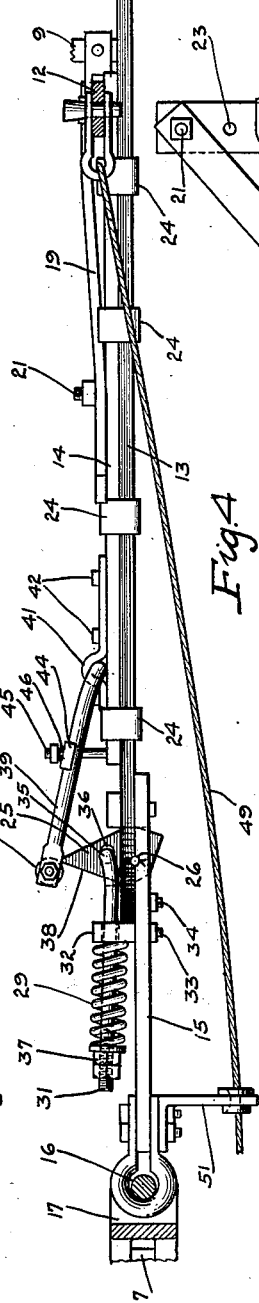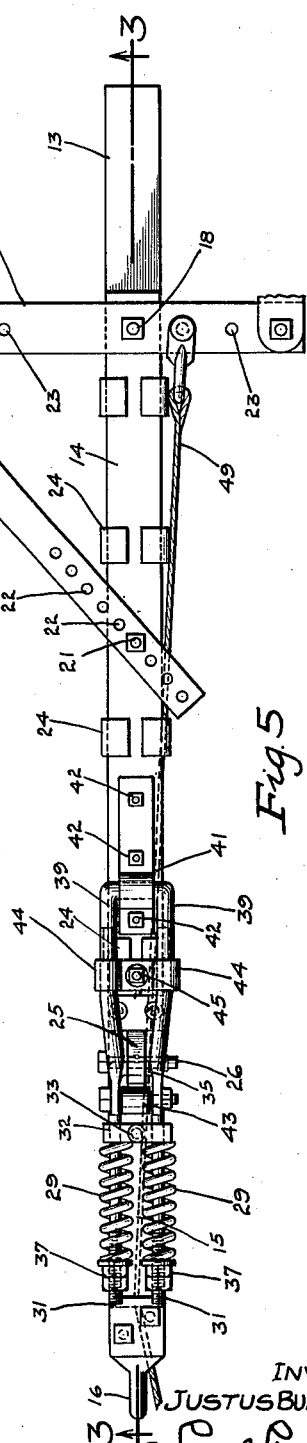

July 19, 1932.   J. BURGGRAFF   1,867,726
TRACTOR HITCH
Filed July 3, 1930   3 Sheets-Sheet 3

INVENTOR
JUSTUS BURGGRAFF
ATTORNEYS

Patented July 19, 1932

1,867,726

UNITED STATES PATENT OFFICE

JUSTUS BURGGRAFF, OF BOWLUS, MINNESOTA

TRACTOR HITCH

Application filed July 3, 1930. Serial No. 465,552.

This invention relates to new and useful improvements in tractor hitches, and more particularly relates to a safety draft appliance for connecting a tractor to a plow, harrow, or other soil working implement, having means for automatically disconnecting the trailing apparatus from the tractor, when the latter strikes an obstruction such, for example, as a stone.

A feature of the invention is to provide a tractor hitch comprising telescopic draft members operatively connected together, one adapted to be connected to the tractor and the other to the plow or other implement to be drawn by the tractor, having means for operatively connecting together said members to withstand a normal draft load, and the connecting means between said members being adapted, under the influence of an abnormal pulling effort, to automatically become inoperative and permit the release of the plow from the tractor, thereby preventing the parts from becoming damaged.

A further object is to provide a tractor hitch for coupling a plow or other implement to a tractor, which is provided with means for automatically permitting the release of the plow from the tractor under the influence of an abnormal pulling effort, and adapted upon reverse movement of the tractor, to cause the plow to be automatically re-connected to the tractor, so that when the plow strikes a stone and is released from the tractor, the operator need only reverse the tractor to re-connect the plow thereto, after which he may again proceed on his way. In some instances, it may be necessary to lift the plow out of engagement with the obstruction, before the plow can be moved forwardly.

A further object is to provide a tractor hitch provided with means for automatically releasing the plow from the tractor in the event that the plow strikes a stone or root embedded in the soil, thereby preventing damage to the plow and hitch, and means also being provided for automatically rendering the tractor clutch inoperative when the plow is thus released from the tractor, whereby movement of the tractor also will be interrupted.

The primary object of the invention, therefore, is to provide a safety hitch or coupling device, more particularly applicable for use in connection with tractors and soil working implements to be drawn thereby, which is so constructed that it will automatically release the plow from the tractor, when the latter strikes an obstruction, and whereby the plow may be quickly reconnected to the tractor without the operator having to leave the tractor seat, thereby greatly expediting the work of tilling or working the soil.

Features of the invention reside in the arrangement of the telescopic draft members; in the means for operatively connecting together said draft members, whereby when the hitch is subjected to an abnormal tensional or pulling strain, said means will become inoperative and permit the release of the plow from the tractor; in the means provided in connection with the clutch pedal of the tractor for throwing it into an inoperative position upon automatic release of the plow from the tractor; in the snubber provided between the tractor and plow for limiting the relative forward movement of the tractor when the hitch is rendered inoperative; and, in the simple and inexpensive construction of the apparatus, whereby it may be manufactured at a comparatively low cost.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 1 is an elevational view diagrammatically illustrating a portion of a tractor and a portion of a plow with the novel hitch interposed therebetween;

Figure 2 is an enlarged plan view of Figure 1;

Figure 3 is an enlarged longitudinal sectional view on the line 3—3 of Figure 5, showing the telescopic draft members operatively connected together;

Figure 4 is a side elevation of the hitch showing a position of the parts when subjected to an abnormal pull;

Figure 5 is a plan view of Figure 3;

Figure 11 is an enlarged detail sectional view on the line 11—11 of Figure 2, illustrating a spring device used in the construction of the snubber.

Figure 7:
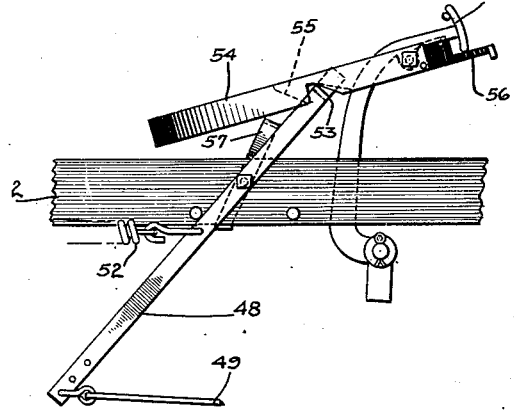
Figure 7 is an enlarged detail view diagrammatically illustrating the position of the clutch pedal operating mechanism, the parts being shown in the position assumed when the clutch pedal is in an operative position.

In the selected embodiment of the invention here shown, there is illustrated in Figures 1 and 2, a portion of a tractor comprising the usual frame 2, engine 3, transmission case 4 provided with the usual clutch pedal 5, rear traction wheels 6, and the draw bar 7, suitably secured to the rear portion of the tractor, as indicated.

The tractor hitch featured in this invention may be used for coupling various appliances to the tractor. In the present instance it is shown used in connection with a plow of conventional well-known type. The plow is shown provided with the usual plow shares 8 secured to the plow beams 9, which may be supported upon suitable wheels 11 and are provided at their forward ends with a cross member 12, best shown in Figures 2 and 5.

The novel hitch featured in this invention is shown comprising a pair of telescopic draft members 13 and 14, the former being shown provided with an off-set extension 15 at its forward end having an eye 16 whereby it may be connected to the draw bar 7 of the tractor by means of a suitable clevis 17, shown in Figure 2. The draft member 14 is suitably secured to the cross member 12 of the plow by means of a bolt 18 and has one end of a bar 19 secured thereto, the opposite end of which is secured to the cross member 12. This bar provides a diagonal brace for rigidly bracing the draft member 14 to the cross member 12 so that the draft member 14 will be held in fixed relation thereto when subjected to lateral strains such as when turning corners. The diagonal brace bar 19 is secured to the draft member 14 and cross member 12 by bolts 21, and the bar 19 is preferably provided with a series of apertures 22 whereby the position of the bar 19 with respect to the draft and cross members 14 and 12, respectively, may be varied. The cross member 12 likewise is provided with a series of apertures 23 to permit lateral adjustment of the plow with respect to the hitch.

The draft members 13 and 14 are here shown slidably connected together by means of suitable clips 24 which, in the present instance, are secured to the draft member 14 so that the member 13 may slide in said clips when the hitch is extended.

An important feature of this invention resides in the simple means provided for operatively connecting together the draft members 13 and 14. Such means consists of a hook element 25 pivotally supported upon a pin 26, here shown clamped between the draft member 13 and its forward extension 15, as shown in Figures 3 and 4. When thus secured, suitable grooves are provided in the adjacent faces of the members 13 and 15 adapted to receive the pin 26. Alined slots 27 and 28 are provided in the parts 13 and 15 in which the hook element 25 is mounted, as best shown in Figure 3.

The hook element 25 is normally retained in the position shown in Figure 3 by suitable compression springs 29, shown coiled about a pair of rods 31 slidably supported in a guide block 32 secured to the extension 15 of the forward draft member 13, by suitable bolts 33 and 34. The rods 31 are shown integrally formed of one piece and are connected by a portion 35 traversing an aperture 36 provided in the hook element 25 above the pivot pin 26. The rods 31 are threaded to receive adjusting nuts 37 whereby the tension of the springs 29 may be varied so as to cause the hitch to release the plow when a predetermined tensional or pulling load is exerted upon the draft members 13 and 14. The forward edge 38 of the hook element is normally seated against the front wall of the alined apertures 27 and 28 by the action of the springs 29, as shown in Figure 3.

A member 39 is pivotally mounted upon the draft member 14 by a suitable metallic strap 41, secured to the member 14 by bolts 42. An anti-friction roller 43 is rotatably mounted between the spaced legs of the pivoted member 39 and is adapted to engage the front edge 38 of the hook element 25, as shown in Figures 3 and 5. A saddle 44 is engaged with the spaced legs of the pivoted member 39 and is retained thereon by means of a stud 45, shown secured to the draft member 14.

A coil spring 46 is mounted upon the stud 45 and exerts a downward pressure upon the saddle 44 to yieldably retain the member 39 in the position shown in Figure 3.

Figure 6:
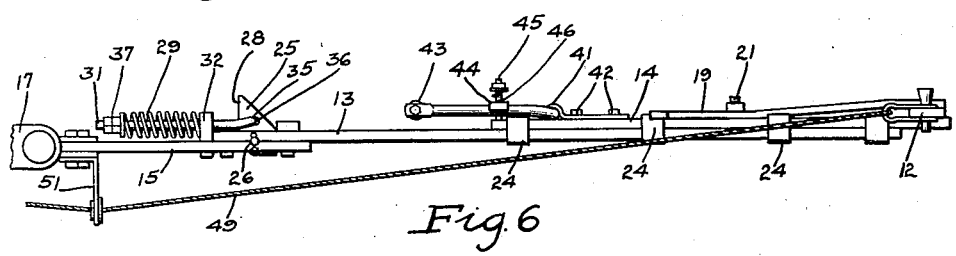
Figure 6 is a view similar to Figure 4, on a smaller scale, showing the extended position of the hitch, when the coupling is rendered inoperative as a result of the plow striking an obstruction in the soil.

In the operation of the parts above described, the pivoted member 39 is engaged with the hook element 25, as shown in Figure 3, whereby the plow or other implement to be drawn by the tractor will be operatively connected therewith. Under normal operating conditions, the parts will be retained in the positions shown in Figures 3 and 5. When the hitch is subjected to an abnormal pulling strain as, for example, when the plow strikes a stone or other obstruction in the soil, the tensional strain exerted upon the telescopic draft members 13 and 14, will cause the pivoted member 39 to rock the hook element 25 from the position shown in Figure 3 to that shown in Figure 4, against the tension of the compression springs 29 and also against the tension of the relatively lighter spring 46, coiled about the stud 45. When the hook element 25 is tilted to a certain angle, the roller 43 will ride upwardly over the inclined forward face 38 of the hook element and thus cause the member 39 to become disengaged from the hook element 25, whereupon the draft members 13 and 14 may be relatively moved and the hitch extended from the position shown in Figure 3 to that shown in Figure 6.

Figure 8:
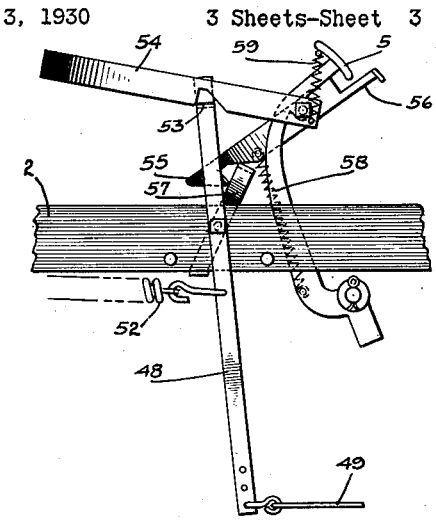
Figure 8 is a view illustrating the positions of the parts of the clutch operating mechanism when the latter has been partially actuated as a result of the plow having become released from the tractor.
Figure 9:
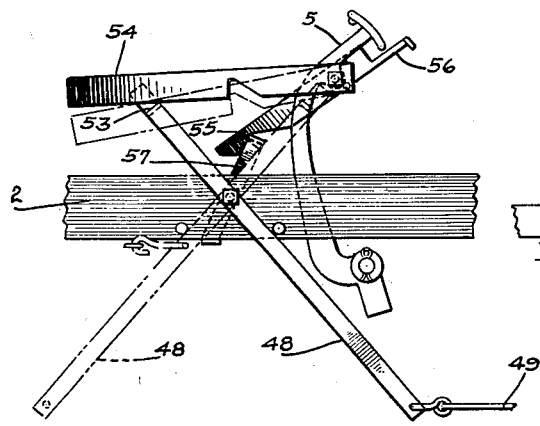
Figure 9 is a view illustrating the positions of the parts shown in Figures 7 and 8, when the tractor hitch has reached the limit of its extended position and the clutch pedal actuated to stop further movement of the tractor.
Figure 10:
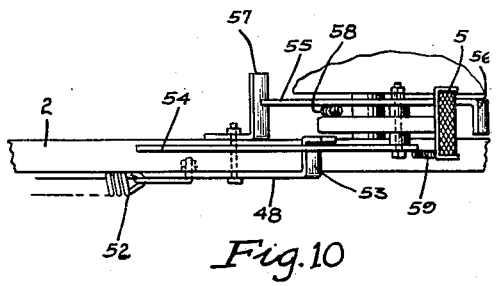
Figure 10 is a plan view of Figure 7.

Means are preferably provided for automatically interrupting forward movement of the tractor when the hitch is rendered inoperative as a result of the plow striking an obstruction in the soil. Such means is best shown in Figures 7 to 10, inclusive and consists of a lever 48 pivoted to the frame 2 of the tractor and having a cable 49 connecting the lower end thereof with the cross member 12 of the plow. The intermediate portion of this cable is shown guidingly supported in a suitable guide 51 shown secured to the forward end portion of the extension 15 of the draft member 13. The lever 48 is normally retained in the position shown in Figure 7 by means of a tension spring 52 having one end secured thereto and its opposite end fixed to the tractor frame. The upper end of the lever 48 has an off-set portion 53 adapted to engage a notched arm 54 pivotally connected with the clutch pedal 5, as will be readily understood by reference to Figures 7 and 8. A suitable hook 55 is also pivoted to the clutch pedal 5 and has an extension 56 provided at the upper end thereof which is positioned adjacent to the tread of the foot pedal 5 so that it may be actuated by the foot of the operator to move it out of engagement with a bracket 57 secured to the tractor frame, as illustrated. When the clutch pedal is in its normal operative position, as shown in Figure 7, the hook 55 may be retained in the dotted line position shown by the action of a spring 58, having one end secured to the lower portion of the clutch pedal and its other end to the hook 55, whereby the extension 56 of the hook will be seated against the lower edge of the tread of the clutch pedal. When the parts are thus positioned, the notched arm 54 will be supported upon the off-set portion 53 of the lever 48, as shown in Figure 7, a suitable spring 59 being provided to constantly urge the free end of the arm 54 downwardly. This spring is indicated in Figure 8.

When the plow strikes an obstruction and the hook element 25 of the hitch is tilted to permit the pivoted member 39 to become disengaged therefrom, the tractor may continue its forward movement until the cable 49 swings the lever 48 from the position shown in Figure 7 to that shown in Figure 8, whereupon the clutch pedal 5 will be moved forwardly to a position to render the clutch inoperative. Such forward movement of the clutch pedal will cause the hook 55 to become engaged with the bracket 57, whereby the clutch pedal will be retained in its inoperative position, as will readily be understood by reference to Figures 8 and 9. Should the tractor continue forwardly, after the clutch has been rendered inoperative, because of momentum or gravity, as when traveling down grade, the lever 48 will move out of engagement with the notch provided in the arm 54 to the full line position shown in Figure 9. When the tractor finally comes to rest, the operator may reverse its movement by depressing the extension 56 of the hook 55, whereupon the latter will become disengaged from the bracket 57 and permit the clutch pedal to be returned to its normal operative position shown in Figure 7. As the tractor is reversed or moved backwardly, the pivoted member 39 will automatically become operatively engaged with the hook element 25, whereupon the hitch is again rendered operative. The length of the cable 49 is such as to cause the tractor to come to rest before the draft members 13 and 14 become disengaged from each other.

To positively limit the forward relative movement of the tractor with respect to the plow, a suitable snubber may be interposed between the draw bar 7 of the tractor and the cross member 12 of the plow, as shown in Figures 1 and 2. This snubber is here shown comprising suitable spring devices 61 adapted to be connected to the draw bar 7 of the tractor and the cross member 12 of the plow and connected together by a suitable flexible element 62 such as a chain. When the tractor hitch is rendered inoperative, as a result of the plow striking an obstruction in the soil, the chain 62 will become taut and thus limit the forward movement of the tractor. This snubber is particularly useful in the event that the plow strikes an obstruction when the tractor is traveling down grade, as it will positively cause the tractor to come to a stop, it being understood that the connection between the plow and the clutch pedal of the tractor is such that the tractor clutch will be rendered inoperative before the chain 62 becomes taut.

The novel tractor hitch and clutch-operating means herein disclosed provides a very simple and inexpensive apparatus for use in connection with tractors and plows and other ground-working implements. Its construction is such that it is substantially fool-proof in operation, and because of the telescopic or sliding connection between the draft members 13 and 14 and the provision of the snubber chain 62, these members are always retained in operative relation, so that when the plow is automatically released from the tractor, the simple reversal of the tractor with respect to the plow will cause the hitch to become operative, and the operator may then, if necessary, lift the plows out of the soil to clear the obstruction, whereupon the apparatus may again be moved forwardly.

I claim as my invention:

1. In a tractor hitch, slidably connected draft members, one adapted to be connected to a tractor and the other to a plow, one of said members having an elongated aperture therein, a hook element pivotally supported in said aperture and having a face abuttingly engaged with a wall of the aperture when said element is in normal operative position, a spring retaining the hook element in normal position, a link pivotally mounted upon the other of said draft members and adapted to engage said hook element to operatively connect together said draft members, and means exerting a downward pressure upon said link to retain it in operative position.

2. In a tractor hitch, a pair of draft members, one adapted to be connected to a tractor and the other to a plow, one of said members having an elongated aperture therein, a hook element pivotally supported in said aperture and having a face abuttingly engaged with a wall of the aperture when said element is in normal operative position, means for retaining the hook element in normal operative position, a link pivotally mounted upon the other of said draft members and adapted to engage said hook element to operatively connect together said draft members, said hook-retaining means being adapted to yield when the hitch is subjected to an abnormal pulling load whereby the hitch is rendered inoperative, and means whereby said hitch may automatically be rendered operative upon reversal of the tractor with reference to the plow.

3. In a tractor hitch, a pair of draft members connected together and adapted for relative movement, one of said members being adapted to be connected to a tractor and the other to a plow, a hook element pivotally mounted in an elongated aperture provided on one of said draft members and provided with means for normally retaining it in operative position, a link pivotally connected to the other of said draft members and provided with an anti-friction roller adapted to engage said hook element to operatively connect together said draft members, a flexible element operatively connected with the draft member connected to the plow and having a connection with a lever pivotally mounted on the tractor, an arm pivoted to the clutch pedal of the tractor and adapted to be engaged by said lever upon relative movement of said draft members, whereby the clutch pedal will be moved to an inoperative position, and means for retaining the clutch pedal in inoperative position.

4. In a tractor hitch, a pair of draft members connected together and adapted for relative movement, one of said members being adapted to be connected to a tractor and the other to a plow, a hook element pivotally mounted on one of said draft members and provided with means for normally retaining it in operative position, a link pivotally connected to the other of said draft members and provided with an anti-friction roller adapted to engage said hook element to operatively connect together said draft members, said hook and link being adapted to become disengaged from each other upon an abnormal pull of the tractor, as when the plow strikes an obstruction, and thereby permit relative movement of said draft members a flexible element having one end operatively connected with the rear draft member and having its opposite end connected with a lever pivotally mounted on the tractor, an arm pivoted to the clutch pedal of the tractor and adapted to be engaged by said lever upon relative movement of said draft members, whereby the clutch pedal will be moved to a position to render the tractor clutch inoperative, means for retaining the clutch pedal in such position, means for manually releasing said pedal, and means whereby when said pedal is released and movement of the tractor is reversed, said hook element and link will become engaged and thus automatically reconnect the plow with the tractor.

5. In a tractor hitch, a draft member having means for attaching it to a tractor, a second draft member having means for attaching it to an implement to be drawn, a single hook element pivotally mounted upon one of said draft members, a spring normally holding said hook element in an operative position, a coupling member pivotally mounted upon the other of said draft members, means normally holding said coupling member in position to engage said hook element, whereby said coupling member may automatically operatively engage said hook element, when the draft members are relatively moved with respect to each other in one direction, said spring permitting said hook element to rotate upon its axis and release said coupling members, when the hitch is subjected to an abnormal load.

6. In a tractor hitch, a pair of draft members connected together and adapted for relative movement, one of said members having means for connecting it to a tractor and the other to a plow, a hook element pivotally mounted on one of said draft members and provided with means for normally retaining it in operative position, a link pivotally connected to the other of said draft members and adapted to engage said hook element to operatively connect together said draft members, said hook and link being adapted to automatically disengage each other upon an abnormal pull of the tractor, as when the plow strikes an obstruction, and thereby permit relative movement of said draft members, a flexible element having one end operatively connected with the rear draft member and having its opposite end connected with a lever pivotally mounted on the tractor, an arm pivoted to the clutch operating member of the tractor and having a releasable connection with said lever by which said clutch-operating member may be operated to render the tractor clutch inoperative upon relative movement of said draft members, means permitting the clutch-operating member to be returned to clutch-operating position, and means whereby when the movement of the tractor is reversed, said hook element and said link will become operatively engaged with each other and thus automatically reconnect the plow with the tractor.

In witness whereof, I have hereunto set my hand this 1st day of July, 1930.

JUSTUS BURGGRAFF.